UNITED STATES PATENT OFFICE.

ADOLF LIEBMANN, OF MANCHESTER, COUNTY OF LANCASTER, ENGLAND.

PRODUCTION OF YELLOW COLORING-MATTER.

SPECIFICATION forming part of Letters Patent No. 404,097, dated May 28, 1889.

Application filed August 16, 1888. Serial No. 282,874. (No specimens.)

*To all whom it may concern:*

Be it known that I, ADOLF LIEBMANN, of Manchester, in the county of Lancaster, England, have discovered a new number of Coloring-Matters Suitable for Dyeing and Printing, of which the following is a full, true, and exact description.

To produce the same, I proceed in the following way: Forty pounds of primuline, also called "polychromineate," a yellow coloring-matter, are dissolved in four hundred gallons of water. This solution is acidulated with forty pounds of hydrochloric acid and then treated with a solution of seven pounds of sodium nitrite in two gallons of water. The nitrite solution is added gradually, and care must be taken to keep the whole mass well stirred and the temperature below 10° centigrade. The thus-formed diazo compound of primuline is allowed to run into an alkaline solution of fifteen pounds of beta-naphthol, which is constantly agitated and which has to be cooled by means of ice. The formation of a red precipitate takes place at once. This product is, however, useless for dyeing purposes, as it is nearly insoluble. To render it soluble, I treat it in the following manner: Twenty pounds of the well washed and dried precipitate are mixed with fifty pounds of bisulphite of soda of about fifty Twaddle and boiled for an hour at the reversed condenser. The coloring-matter enters into combination with the bisulphite of soda and forms an easily-soluble product, which can be precipitated by common salt and purified by re-solution and re-precipitation. It forms a yellow powder, which is easily soluble in water. It is decomposed by caustic alkalies and the original insoluble coloring-matter is reproduced. When printed on cloth and afterward steamed, the product is decomposed and the red developed on the cloth. This color is very fast, even to boiling soap. This body dissolves in concentrated sulphuric acid with a claret color, sulphurous acid being evolved at the same time.

I do not limit myself to the quantities nor chemicals mentioned in the above description. Both may be altered. Nitrite of soda may be replaced by any other nitrite, or by nitrous acid, bisulphite of soda in solution, by solid bisulphite of soda, or by any other suitable bisulphite or sulphite which will produce the desired result. The compound which is formed by combining primuline with naphthol may or may not be dried before treating it with bisulphite of soda.

What I claim as my invention, and desire to secure by Letters Patent, is—

As a new product, the soluble yellow coloring-matter herein described, which is decomposed by caustic alkalies, reproducing the original insoluble coloring-matter; when printed on cloth and afterward steamed, the product is decomposed and red color developed on the cloth; when dissolved in concentrated sulphuric acid, a claret color is produced and sulphurous acid simultaneously evolved, substantially as described.

In testimony whereof I have signed my name to this specification in the presence of two subscribing witnesses.

ADOLF LIEBMANN.

Witnesses:
 JEAN GRUND,
 JACOB MUELLER.